United States Patent
Jiang et al.

(10) Patent No.: US 8,821,968 B2
(45) Date of Patent: Sep. 2, 2014

(54) PROCESS FOR MAKING LAYER-STRUCTURED CATALYSTS AT THE ELECTRODE/ELECTROLYTE INTERFACE OF A FUEL CELL

(75) Inventors: Xirong Jiang, Stanford, CA (US); Xu Tian, Stanford, CA (US); Friedrich B. Prinz, Woodside, CA (US); Stacey F. Bent, Stanford, CA (US); Joon Hyung Shim, Cupertino, CA (US); Masayuki Sugawara, Asaka (JP); Hong Huang, Palo Alto, CA (US)

(73) Assignees: The Board of Trustees of the Leland Stanford Junior University, Palo Alto, CA (US); Honda Motor Co., Ltd, Tokyo (JP)

( * ) Notice: Subject to any disclaimer, the term of this patent is extended or adjusted under 35 U.S.C. 154(b) by 1234 days.

(21) Appl. No.: 12/290,649

(22) Filed: Oct. 31, 2008

(65) Prior Publication Data
US 2009/0218311 A1 Sep. 3, 2009

Related U.S. Application Data

(60) Provisional application No. 61/001,426, filed on Oct. 31, 2007.

(51) Int. Cl.
| | |
|---|---|
| *B05D 5/12* | (2006.01) |
| *C23C 14/24* | (2006.01) |
| *C23C 14/34* | (2006.01) |
| *H01M 4/88* | (2006.01) |
| *H01M 8/10* | (2006.01) |
| *H01M 8/12* | (2006.01) |
| *H01M 4/86* | (2006.01) |

(52) U.S. Cl.
CPC .......... *H01M 8/1097* (2013.01); *H01M 4/8885* (2013.01); *Y02E 60/525* (2013.01); *H01M 8/1286* (2013.01); *H01M 4/8657* (2013.01); *Y02E 60/523* (2013.01); *H01M 8/124* (2013.01); *H01M 4/8621* (2013.01)
USPC ...................................................... 427/115

(58) Field of Classification Search
USPC ............................................ 427/58, 115, 301
See application file for complete search history.

(56) References Cited

U.S. PATENT DOCUMENTS

| | | |
|---|---|---|
| 2002/0127456 A1 | 9/2002 | Pham et al. |
| 2004/0028975 A1* | 2/2004 | Badding et al. ................. 429/32 |
| 2005/0202159 A1* | 9/2005 | Svoboda et al. ............... 427/115 |
| 2009/0087697 A1* | 4/2009 | Ramanathan et al. ..... 427/115 X |
| 2009/0183992 A1* | 7/2009 | Fredenberg et al. ........ 427/58 X |

FOREIGN PATENT DOCUMENTS

| | | |
|---|---|---|
| WO | WO2007/084776 | 6/2007 |
| WO | WO 2007/084776 A | 7/2007 |

* cited by examiner

*Primary Examiner* — Leo B Tentoni
(74) *Attorney, Agent, or Firm* — Lumen Patent Firm (57) ABSTRACT

A method of fabricating a layer-structured catalysts at the electrode/electrolyte interface of a fuel cell is provided. The method includes providing a substrate, depositing an electrolyte layer on the substrate, depositing a catalyst bonding layer to the electrolyte layer, depositing a catalyst layer to the catalyst bonding layer, and depositing a microstructure stabilizing layer to the catalyst layer, where the bonding layer improves adhesion of the catalyst onto the electrolyte. The catalyst and a current collector is a porous catalyst and a fully dense current collector, or a fully dense catalyst and a fully dense current collector structure layer. A nano-island catalyst and current collector structure layer is deposited over the catalyst and current collector or over the bonding layer, which is deposited over the electrolyte layer. The fuel cell can be hydrogen-fueled solid oxide, solid oxide with hydrocarbons, solid sensor, solid acid, polymer electrolyte or direct methanol.

24 Claims, 5 Drawing Sheets

PROCESS FOR MAKING LAYER-STRUCTURED CATALYSTS AT THE ELECTRODE/ELECTROLYTE INTERFACE OF A FUEL CELL

CROSS-REFERENCE TO RELATED APPLICATIONS

This application is cross-referenced to and claims the benefit from U.S. Provisional Patent Application 61/001,426 filed Oct. 31, 2007, which is hereby incorporated by reference.

FIELD OF THE INVENTION

The present invention relates generally to fuel cells. More particularly the invention relates to layer-structured catalysts and current collection grids designed to increase fuel cell efficiency.

BACKGROUND

A solid oxide fuel cell (SOFC) is an all-solid device that converts the chemical energy of gaseous fuels such as hydrogen and simple hydrocarbons into electricity through electrochemical processes. With the ever-increasing concern over the future availability of alternative energy sources, there is significant interest in the research and development of SOFCs because of their unique advantages over traditional power generation technologies. The efficiency of SOFCs is inherently high because it is not limited by the Carnot efficiency of a heat engine. In SOFCs, hydrogen and simple hydrocarbons can be electrochemically oxidized at the anode. Due to the operating temperature range of SOFCs, the fuel-processor can be incorporated into the fuel cell stack, which enables innovative thermal integration/management design features to provide excellent system efficiencies. SOFCs can be also used for co-generation of steam or hot water, which if coupled with gas turbines to produce electrical power can enhance the overall system efficiency and the range of applications. In addition, the greenhouse gas emissions from SOFCs are much lower than those emitted from conventional power plants.

Current research activities in the development of SOFCs are increasingly focused on reducing operating temperatures of SOFCs from traditional values near 1000° C. to lower temperatures of 500-800° C. Such a reduction in operating temperature would lessen sealing problems, reduce performance degradation, and enable replacement of ceramic interconnects by cheaper metallic materials. However, a reduction of the operating temperature is detrimental from an electrochemical point of view. In general, fuel cells suffer from three major losses including (a) activation losses arising from sluggish kinetics of the electrochemical charge-transfer reactions at the electrodes, (b) ohmic loss mainly stemming from slow ionic conduction in the electrolyte, and (c) concentration loss originating from the limited mass transport at high current densities. At reduced operating temperature, the thermally-activated electrode reactions and ion transport in the electrolyte become slower, resulting in lowered fuel cell performance. To reduce ohmic losses at reduced temperatures, an electrolyte with higher ionic conductivity or a thinner electrolyte structures is required. As the electrolyte resistance decreases, the overall cell losses then become dominated by the polarizations of electrochemical reactions at the anode and cathode. Therefore, the electrode material requires particular attention in the development and optimization of low temperature SOFCs.

Pt is well known for its chemical stability and for its excellent electrical properties at high temperatures, leading to enormous application prospects in catalysis and microelectronics. Pt has been reported to have excellent catalytic activity for the $O_2$ reduction reaction and the $H_2$ oxidation reaction at the electrode/electrolyte interface of an SOFC even at low operating temperatures. When Pt is used as the catalytic material/electrode, the oxygen reduction reaction is dominated by the electrode surface path, and bulk diffusion of oxygen is negligible. Thus, maximizing the surface area (triple phase boundary) while minimizing the Pt bulk is beneficial. Meanwhile, sufficient electrical connectivity is required, putting severe limitations on Pt film thickness by traditional deposition methods.

Though Pt provides excellent catalytic activity for the $O_2$ reduction reaction and the $H_2$ oxidation reaction at the electrode/electrolyte interface of an SOFC at low operating temperatures, pure Pt catalysts suffer from an increase of grain size and a decrease of porosity during fuel cell operation originating from the change of microstructure at high temperature. This effect is aggravated with decreasing Pt film thickness.

What is needed is a method of stabilizing the Pt thin film microstructure at high temperatures, and improving the adhesion of the Pt films onto the electrolyte. What is further needed is a method of reducing the noble metal loading in fuel cells for reducing the cost of fuel cells. Additionally what is needed is a method to modify the chemical properties of the substrate surface for patterning resulting in a Pt electrode/catalyst and Pt current collector grids on the SOFC to improve the fuel cell power efficiency.

SUMMARY OF THE INVENTION

In order to address the current needs in the art, a method of fabricating layer-structured catalysts at the electrode/electrolyte interface of a fuel cell is provided. The method includes providing a substrate, depositing an electrolyte layer on the substrate, depositing a catalyst bonding layer to the electrolyte layer, depositing a catalyst layer to the catalyst bonding layer, where the catalyst bonding layer improves the adhesion of the catalyst layer onto the electrolyte layer and depositing a microstructure stabilizing layer to the catalyst layer.

In one aspect of the invention, the substrate can include silicon wafer, glass, plastic, metal foil, anodic aluminum oxide, carbon aerogels, alumina aerogels, and silica aerogels, where the substrates are used as a supporting material for a structure of the fuel cell.

According to another aspect of the invention the electrolyte layer is a proton or oxygen ion conductive material such as NAFION (a sulfonated tetrafluoroethylene based fluoropolymer-copolymer), polyethereteherketone (PEEK), $H_3PO_4$ doped polybenzimidazole (PBI), Y doped $BaCeO_3$, Y doped $BaZrO_3$, Yb doped $SrCeO_3$, Y doped $ZrO_2$ (YSZ), Y doped bismuth oxide (YDB), Y doped ceria (YDC), Gd-doped ceria (GDC) or Sm doped ceria (SDC). The electrolyte layer and is formed using a thin film deposition process that can include DC/RF sputtering, chemical vapor deposition, electrochemical deposition, pulsed laser deposition, molecular beam epitaxy, evaporation or atomic layer deposition.

In another aspect, the catalyst bonding layer can be $RuO_2$, Ir or $H_xWO_3$.

In a further aspect, the catalyst layer can include Pt, Co, Ir, Cu, Ni, Fe, Ag, Pd, Ti, Ru, Os, Rh, $WO_3$ or Zr.

In one aspect of the invention, the catalyst layer is deposited by atomic layer deposition.

In yet another aspect, the microstructure stabilizing layer can be porous Ni, PtRuCo, PtRuOs, PtRuIrOs, PtRuNiZr or PtRuRh.

According to one aspect of the invention, the steps of depositing the catalyst layer and the microstructure stabilizing layer are repeated to optimize catalytic activity.

In another aspect, the catalyst bonding layer is formed using a thin film deposition process such as DC/RF sputtering, chemical vapor deposition, electrochemical deposition, pulsed laser deposition, molecular beam epitaxy, evaporation or atomic layer deposition.

In another aspect of the invention, the microstructure stabilizing layer is formed using a thin film deposition process such as DC/RF sputtering, chemical vapor deposition, electrochemical deposition, pulsed laser deposition, molecular beam epitaxy, evaporation or atomic layer deposition.

In one aspect of the invention, a structure formed by the catalyst and a current collector is a two-dimensional geometry, where the geometry may be varied.

According to one aspect, a structure formed by the catalyst layer and a current collector layer is a porous catalyst layer and a fully dense current collector layer structure or a fully dense catalyst layer and a fully dense current collector layer structure. Here, a nano-island catalyst layer and current collector layer is deposited over the fully dense catalyst and current collector layer or, over the catalyst bonding layer, where the current collector layer is deposited over the fully dense electrolyte layer.

In another aspect of the invention, the method further includes providing area selective deposition using a resist, where a patterned polymer or self-assembled monolayer is formed on the electrolyte layer using soft lithography. Here, the polymers can include polymethylacrylamide, poly(methylmethacrylate) or polyimidoamine. Further, the self-assembled monolayers can include alkylhalosilanes, fluoroalkylhalosilanes, alkyl- and fluoroalkylalkoxysilanes, or disilazanes. Additionally the soft lithography can include microcontact printing, replica molding, micro-transfer molding, micro-molding in capillaries, or solvent-assisted micromolding. Still further, the area selective deposition is performed using a thin film deposition process such as atomic layer deposition, or chemical vapor deposition, where a patterned polymer or monolayer directs the deposition spatially. In addition, the patterned long-chain polymer or monolayer is removed by thermal treatment, oxygen plasma, UV ozone, or wet chemical etch. Also, the area selective deposition using a resist process is repeated to selectively deposit a current collecting layer. Further, a current collecting layer can be above or below said catalyst layer.

In another aspect of the invention, the fuel cell includes at least a thin and dense electrolyte layer, an electrode layer, where the electrolyte layer is a thin and dense layer or a thin and porous layer, a porous and patterned catalyst layer, and a current collector layer, where the current collector layer is disposed on the porous and patterned catalyst layer, where the porous and patterned catalyst layer is disposed on the electrode layer, where the electrode layer is disposed on the electrolyte layer.

In yet another aspect of the invention, the fuel cell can be a hydrogen-fueled solid oxide fuel cell, a solid oxide fuel cell with hydrocarbons, a solid sensor, solid acid fuel cells, polymer electrolyte fuel cells or a direct methanol fuel cell.

In a further aspect of the invention, the microstructure stabilizing layer and the catalyst layer are a combined layer, where the combined layer is deposited in a single deposition step.

BRIEF DESCRIPTION OF THE FIGURES

The objectives and advantages of the present invention will be understood by reading the following detailed description in conjunction with the drawing, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

This present invention describes a method of fabricating a thermally stable, porous catalyst having a layered-structure with precise control over the two-dimensional geometry and thickness, as well as fabricating a current collector with similar control. In one embodiment, the fabrication process employs atomic layer deposition (ALD) together with the patterning of a self-assembled monolayer (SAM) of polymers to selectively inhibit deposition. The current invention maintains catalytic activity while minimizing the loading of the noble metal Pt using a nano-scale thin film deposition method. The self-limiting adsorption reactions of the deposition process, for example the ALD process, ensure the precise control of film thickness, conformality, and uniformity over a large area. In addition to the application of ALD to the electrode/catalyst layer, the SOFC current collector deposited by ALD improves the fuel cell power efficiency. The technique of area selective ALD provides a current collector such as Pt in a grid pattern by depositing materials in a well-controlled pattern at the surface.

Figure 1:
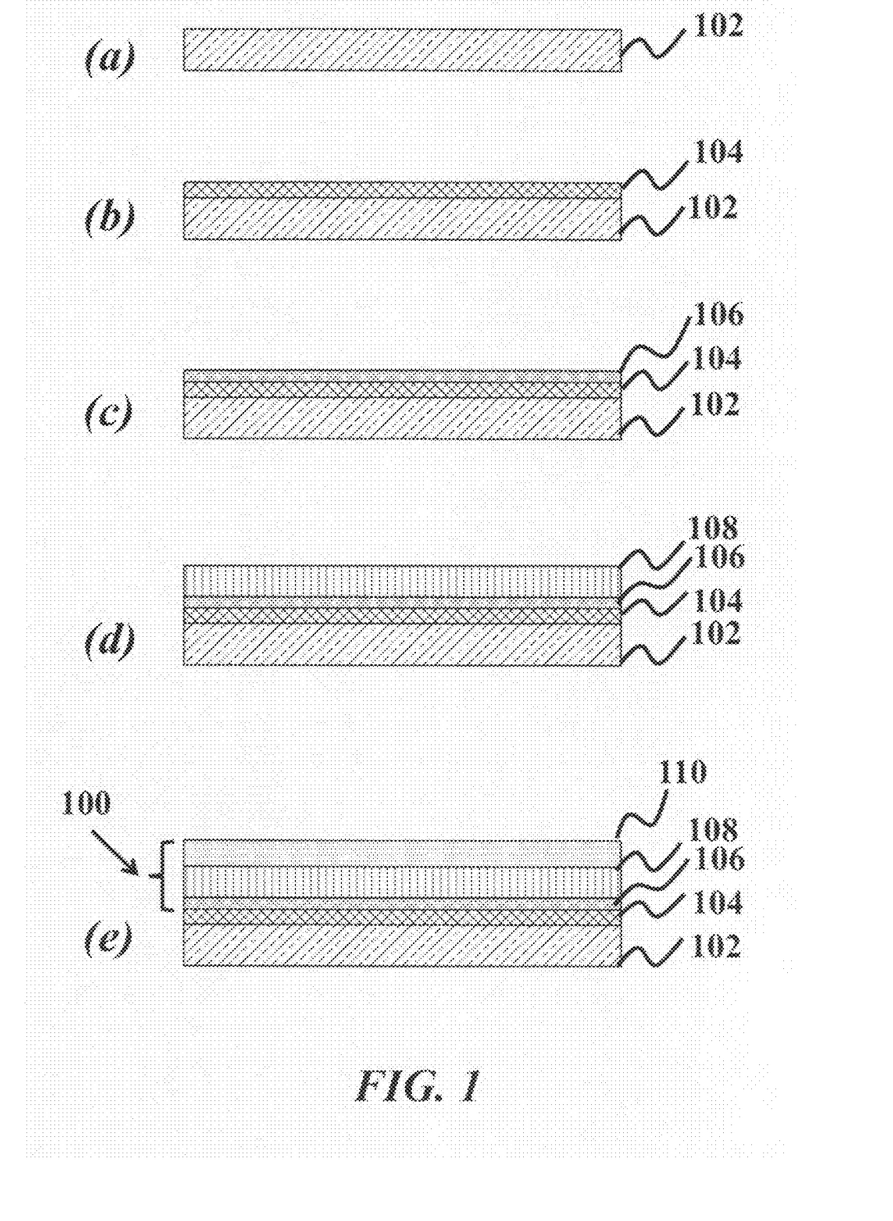
FIG. 1 shows a flow diagram of the steps of fabricating layer-structured catalysts at the electrode/electrolyte interface according to the present invention.

Referring now to the figures, FIG. 1 shows a flow diagram of the steps for fabricating a layer-structured catalysts 100 for use at the electrode/electrolyte interface of a fuel cell, according to the current invention. The layer-structured catalyst 100 fabrication includes the step of providing a substrate 102, depositing an electrolyte layer 104 on the substrate 102, depositing a catalyst bonding layer 106 to the electrolyte layer 104, depositing a catalyst layer 108 to the catalyst bonding layer 106, where the catalyst bonding layer 106 improves the adhesion of the catalyst layer 108 onto the electrolyte layer 104 and depositing a microstructure stabilizing layer 110 to the catalyst layer 108. Here, the substrate 102 can include silicon wafer, glass, plastic, metal foil, anodic aluminum oxide, carbon aerogels, alumina aerogels, and silica aerogels, where the substrate is used as a supporting material for a structure of the fuel cell. It is understood that this is only a possible list of exemplary aerogels and should not be construed as limiting. Additionally, the electrolyte layer 104 is a proton or oxygen ion conductive material such as NAFION (a sulfonated tetrafluoroethylene based fluoropolymer-copolymer), polyetheretheherketone (PEEK), $H_3PO_4$ doped polybenzimidazole (PBI), Y doped $BaCeO_3$, Y doped $BaZrO_3$, Yb doped $SrCeO_3$, Y doped $ZrO_2$ (YSZ), Y doped bismuth oxide (YDB), Y doped ceria (YDC), Gd-doped ceria (GDC) or Sm doped ceria (SDC). The electrolyte layer and is formed using a thin film deposition process that can include DC/RF sputtering, chemical vapor deposition, electrochemical deposition, pulsed laser deposition, molecular beam epitaxy, evaporation or atomic layer deposition. Further, the catalyst bonding layer 106 can be $RuO_2$, Ir or $H_xWO_3$ and the catalyst layer 108 can include Pt, Co, Ir, Cu, Ni, Fe, Ag, Pd, Ti, Ru, Os, Rh, $WO_3$ or Zr. According to the current invention, the catalyst layer 108 is deposited by atomic layer deposition. The final layer of the microstructure stabilizing layer 110 can be porous Ni, PtRuCo, PtRuOs, PtRuIrOs, PtRuNiZr or PtRuRh. It is understood that the steps of depositing the catalyst layer 108 and the microstructure stabilizing layer 110 can be repeated to optimize catalytic activity.

It is understood in this discussion that the layer-structure catalyst can include the catalyst bonding layer 106, the catalyst layer 108 and the microstructure stabilizing layer 110.

According to the current invention, there are many ways of forming the catalyst bonding layer 106, for example the catalyst bonding layer 106 can be formed using a thin film deposition process such as DC/RF sputtering, chemical vapor deposition, electrochemical deposition, pulsed laser deposition, molecular beam epitaxy, evaporation or atomic layer deposition. Similarly, the microstructure stabilizing layer 110 can be formed using a thin film deposition process such as DC/RF sputtering, chemical vapor deposition, electrochemical deposition, pulsed laser deposition, molecular beam epitaxy, evaporation or atomic layer deposition, for example.

In a further aspect of the invention, the microstructure stabilizing layer 110 and the catalyst layer 108 are a combined layer (not shown), where the combined layer is deposited in a single deposition step.

Referring to FIGS. 2(a)-2(h) and FIGS. 3(a)-3(c), the method for fabricating the layer-structured catalyst 100 further includes providing area selective deposition. The area selective deposition includes using a resist, where a patterned polymer 214 (see FIG. 2(h)) or self-assembled monolayer 214 (see FIGS. (e)-2(h)) is formed on the electrolyte layer 104 using soft lithography. Here, the polymers can include polymethylacrylamide, poly(methylmethacrylate) or polyimidoamine. Further, the self-assembled monolayers (SAM) can include alkyltrichlorosilanes, fluoroalkyltrichlorosilanes, alkyl- and fluoroalkyltrialkoxysilanes, or alkyl- and fluoroalkylhalosilanes. Additionally the soft lithography can include microcontact printing, replica molding, micro-transfer molding, micro-molding in capillaries, or solvent-assisted micro-molding. Still further, the area selective deposition is performed using a thin film deposition process such as atomic layer deposition, or chemical vapor deposition, where a patterned polymer or monolayer directs the deposition spatially. In addition, the patterned long-chain polymer or monolayer is removed by thermal treatment, oxygen plasma, UV ozone, or wet chemical etch. Also, the area selective deposition using a resist process is repeated to selectively deposit a current collecting layer. Further, a current collecting layer is above or below the layer-structured catalyst 100 having the microstructure stabilizing layer 110 disposed as an outer layer of the layer-structured catalyst 100.

It is understood that a structure formed by the catalyst and a current collector is a porous catalyst and a fully dense current collector, or a fully dense catalyst and a fully dense current collector structure layer. Here, a nano-island catalyst and current collector structure layer is deposited over the fully dense catalyst and current collector structure layer or over the bonding layer, which is deposited over the fully dense electrolyte layer.

Figure 2:
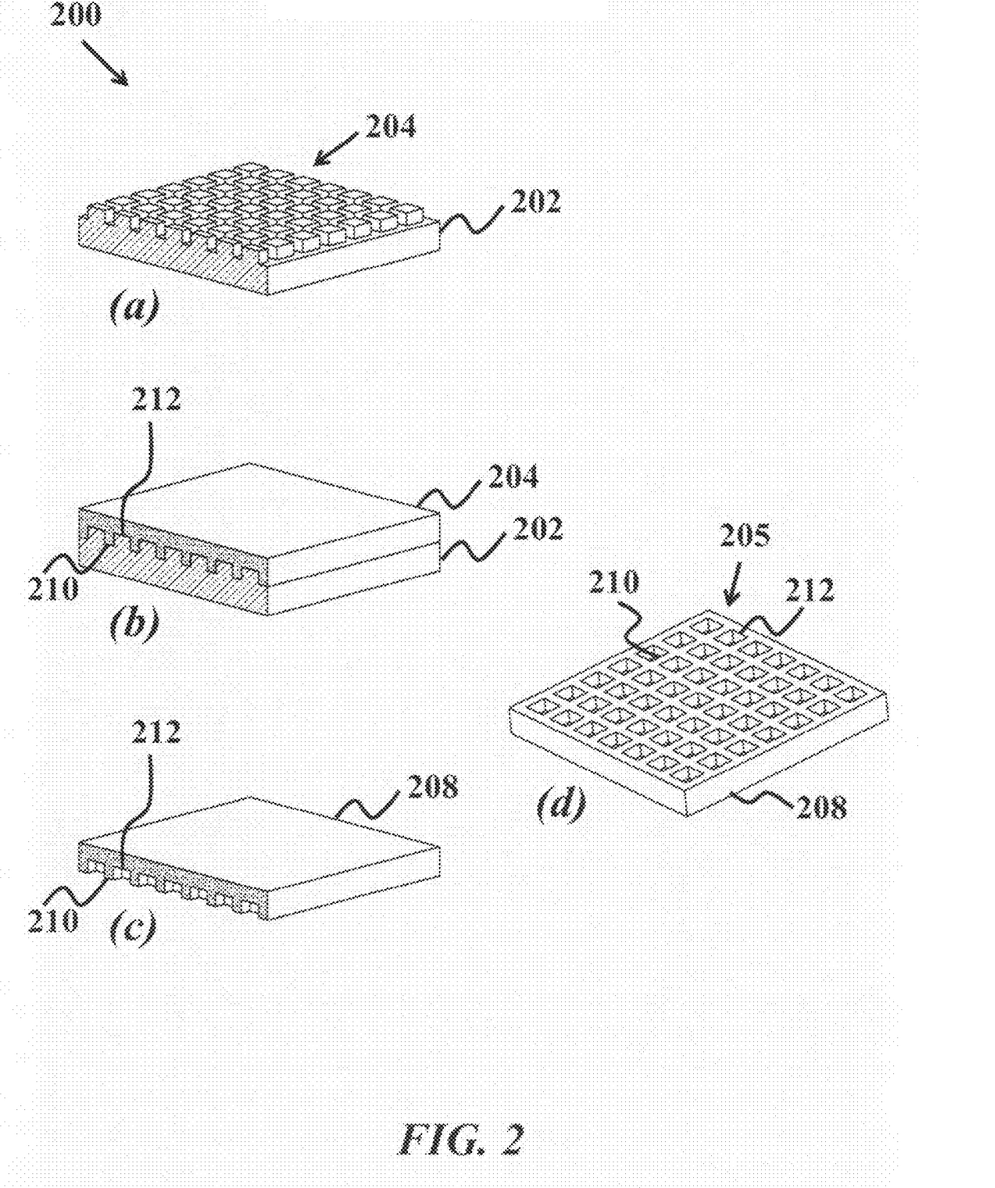
FIGS. 2(a)-2(h) shows a schematic diagram of the steps for fabricating patterned Pt thin films using microcontact printing, according to the present invention.

An example of the area-selective ALD procedure includes the use of microcontact printing methods 200 as shown in FIGS. 2(a)-2(h). FIGS. 2(a)-2(c) show the basic lithographic steps for fabricating a Poly(dimethylsiloxane) (PDMS) stamp 208 (see FIG. 2(d)), where FIG. 2(a) shows a perspective cutaway view of a master substrate 202 having a negative-pattern of a mesh structure 204 of the desired stamp structure. FIG. 2(b) shows a perspective cutaway view of a PDMS layer 206 deposited to the featured surface 204 of the master substrate 202, which conforms to the desired mesh structure pattern 205 of the master substrate 202. FIG. 2(c) shows a perspective cutaway view of the PDMS stamp 208 with the master substrate 202 removed, where shown are the lines 210 and spacings 212. FIG. 2(d) shows a perspective view of the underside of an exemplary PDMS stamp 208 made through the standard lithographic methods above. In this example, the cast PDMS stamp 208 has a mesh structure pattern 205 containing lines 210 and spacings 212 of 2 μm and 4 μm, respectively.

Referring to FIGS. (2e)-2(h), the mesh structure pattern 205 encoded in the PDMS stamp 208 can be transferred via application of a SAM layer 214 to the mesh structure pattern 205 of the PDMS stamp 208, where in this example the SAM solution is developed from 10 mM ODTS solution in anhydrous toluene, and transferred onto a desired surface 216 by microcontact printing (see FIGS. 2(f)-2(h)).

Figure 3:
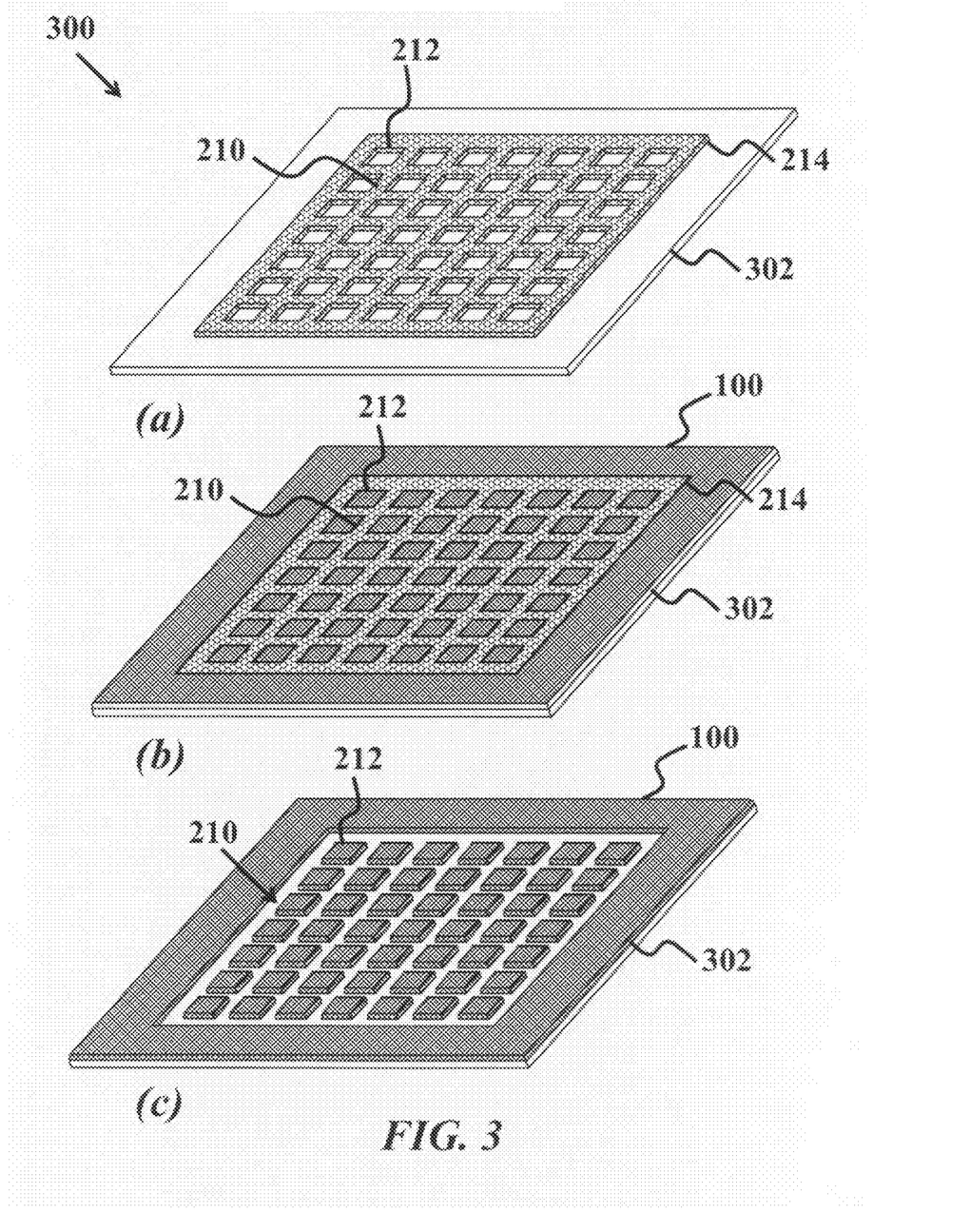
FIGS. 3(a)-3(c) show a flow diagram of the steps of area selective deposition, according to the present invention.

Referring to FIGS. 3(a)-3(c), thin films can be selectively deposited, by ALD for example, onto areas that are not deactivated by ODTS 214. FIG. 3(a) shows a perspective view of an electrode surface 302 with the mesh-structure layer 214, of the ODTS from FIG. 1(h) for example, deposited there to, where the mesh-structure layer 214 includes the lines 210 and spacings 212. FIG. 3(b) shows the layer-structured catalyst 100 deposited onto the surface of the electrode layer 302 and within the spacings 212 and not on the lines 210 of the mesh-structure layer 214. FIG. 3(c) shows the mesh-structure layer 214 removed, where nano-islands of the layer-structured catalyst 100 remains. If desired, the ODTS resist mesh structure 214 can be removed by ozone. It is understood that many possible configurations of the area-selective ALD procedure exist. For example, on each square centimeter area there can be separated mesh structures 214, such as 16 mesh structures 214, to match the fuel cell architecture.

Figure 4:
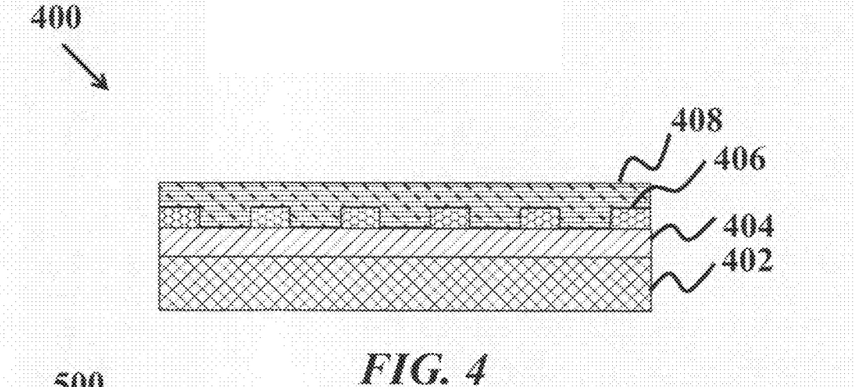
FIG. 4 shows planar cutaway view of a fuel cell according to the current invention.

Referring to FIG. 4, in another aspect of the invention the fuel cell 400 includes at least an electrolyte layer 402, where the electrolyte layer 402 is a thin and dense layer or a thin and porous layer, an electrode layer 404, a porous and patterned layer-structured catalyst 406, and a current collector layer 408, where the current collector layer 408 is disposed on the porous and patterned catalyst layer 406, the porous and patterned layer-structured catalyst layer 406 is disposed on the electrode layer 404, and the electrode layer 404 is disposed on the electrolyte layer 402. It is understood that the structure formed by the catalyst and a current collector is a two-dimensional geometry that may be varied.

Figure 5:
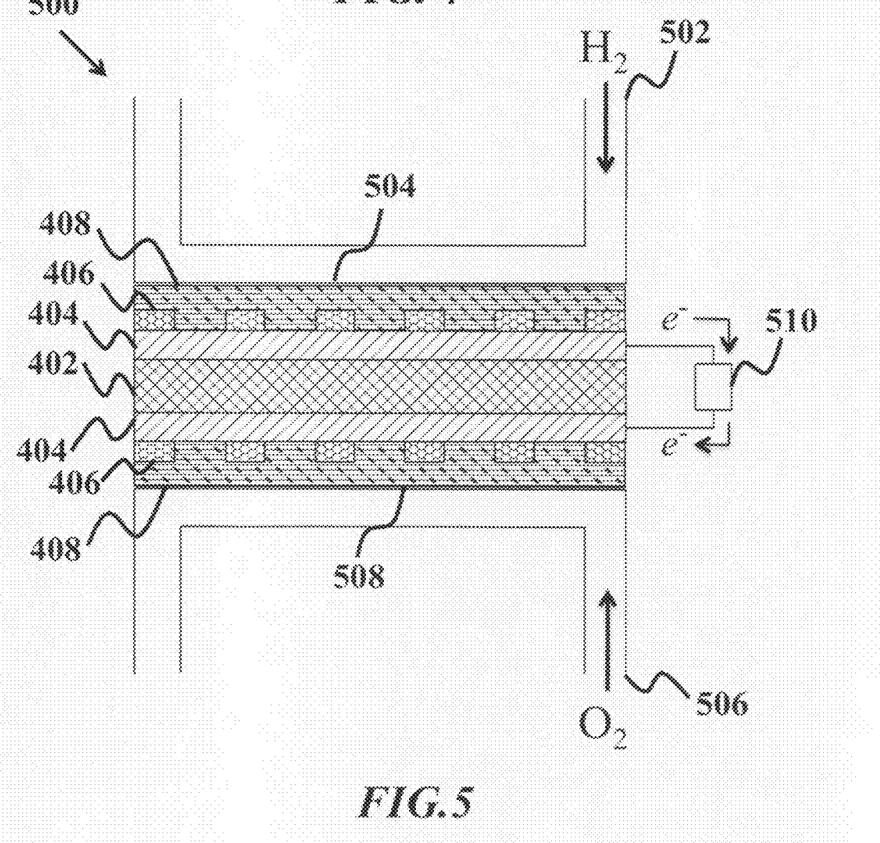
FIG. 5 shows planar cutaway view of a hydrogen fuel cell according to the current invention.

FIG. 5 shows planar cross section view of an example of a hydrogen fuel cell 500 having a mirror structure of the aspects of the fuel cell 400 shown in FIG. 4, in addition to a hydrogen fuel channel 502 at the anode 504 and an oxygen channel 506 at the cathode 508. The thin and dense electrolyte layer 402 is provided with opposing electrode layers 404, and an opposing pair of porous and patterned layer-structured catalyst 406 below current collector layers 408, where the current collector layers 408. Electrons from the hydrogen oxidation reaction at the anode 504 carry electrical energy through an external circuit 510. For fuel cells consisting of a proton conductive electrolyte 402, protons generated in the oxidation process travel across the electrolyte 402 and reduce oxygen at the interface between electrolyte 402 and the cathode 508. For fuel cells consisting of an oxygen ion conductive electrolyte 402, oxygen ions generated in the reduction process travel across the electrolyte 402 and oxidize fuel at the interface between the electrolyte 402 at the anode 504. Protons generated in the oxidation process travel across the electrolyte 402 and reduce oxygen in the oxygen channel 506 at the cathode 508. According to FIG. 4 and FIG. 5, the fuel cell can be a hydrogen-fueled solid oxide fuel cell, a solid oxide fuel cell with hydrocarbons, a solid sensor, solid acid fuel cells, polymer electrolyte fuel cells or a direct methanol fuel cell.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

What is claimed:

1. A method of fabricating a layer-structured catalysts at the electrode/electrolyte interface of a fuel cell comprising:
   a. providing a substrate;
   b. depositing an electrolyte layer on said substrate;
   c. depositing a catalyst bonding layer to said electrolyte layer;
   d. depositing a catalyst layer to said catalyst bonding layer, wherein said catalyst bonding layer improves the adhesion of said catalyst layer onto said electrolyte layer; and
   e. depositing a microstructure stabilizing layer to said catalyst layer to form a layer-structured catalyst, wherein said microstructure stabilizing layer is disposed to interface a current collecting layer.

2. The method of claim 1, wherein said substrate is selected from a group consisting of a silicon wafer, glass, plastic, metal foil, anodic aluminum oxide, and aerogels, wherein said substrate used as a supporting material for a structure of said fuel cell.

3. The method of claim 1, wherein said electrolyte layer is a proton or oxygen ion conductive material, wherein said material is selected from the group consisting of NAFION (a sulfonated tetrafluoroethylene based fluoropolymer-copolymer), polyetheretherketone (PEEK), $H_3PO_4$ doped polybenzimidazole (PBI), Y doped $BaCeO_3$, Y doped $BaZrO_3$, Yb doped $SrCeO_3$, Y doped $ZrO_2$ (YSZ), Y doped bismuth oxide (YDB), Y doped ceria (YDC), Gd-doped ceria (GDC) and Sm doped ceria (SDC), wherein said electrolyte layer is formed using a thin film deposition process selected from a group consisting of DC/RF sputtering, chemical vapor deposition, electrochemical deposition, pulsed laser deposition, molecular beam epitaxy, evaporation and atomic layer deposition.

4. The method of claim 1, wherein said catalyst bonding layer is selected from a group consisting of $RuO_2$, Ir and $H_xWO_3$.

5. The method of claim 1, wherein said catalyst layer is selected from a group consisting of Pt, Co, Ir, Cu, Ni, Fe, Ag, Pd, Ti, Ru, Os, Rh, $WO_3$ and Zr.

6. The method of claim 1, wherein said catalyst layer is deposited by atomic layer deposition.

7. The method of claim 1, wherein said microstructure stabilizing layer is selected from a group consisting of Ni, PtRuCo, PtRuOs, PtRuIrOs, PtRuNiZr and PtRuRh.

8. The method of claim 1, wherein the steps of depositing said catalyst layer and said microstructure stabilizing layer are repeated to optimize catalytic activity.

9. The method of claim 1, wherein said catalyst bonding layer is formed using a thin film deposition process selected from a group consisting of DC/RF sputtering, chemical vapor deposition, electrochemical deposition, pulsed laser deposition, molecular beam epitaxy, evaporation and atomic layer deposition.

10. The method of claim 1, wherein said microstructure stabilizing layer is formed using a thin film deposition process selected from a group consisting of DC/RF sputtering, chemical vapor deposition, electrochemical deposition, pulsed laser deposition, molecular beam epitaxy, evaporation and atomic layer deposition.

11. The method of claim 1, wherein a structure formed by said catalyst and a current collector is a two-dimensional geometry, wherein said geometry is variable.

12. The method of claim 1, wherein a structure formed by said catalyst layer and a current collector layer is a porous said catalyst layer and a fully dense said current collector layer structure or a fully dense said catalyst layer and a fully dense said current collector layer structure.

13. The method of claim 12, wherein a nano-island said catalyst layer and current collector layer is deposited over said fully dense catalyst and current collector layer or over said catalyst bonding layer, wherein said current collector layer is deposited over said fully dense electrolyte layer.

14. The method of claim 1 further comprises providing area selective deposition using a resist, wherein a patterned polymer or self-assembled monolayer is formed on said electrolyte layer using soft lithography.

15. The method of claim 14, wherein said polymers are selected from a group consisting of polymethylacrylamide, poly(methylmethacrylate) and polyimidoamine.

16. The method of claim 14, wherein said self-assembled monolayers are selected from a group consisting of alkylhalosilanes, fluoroalkylhalosilanes, alkyl- and fluoroalkylalkoxysilanes, and disilazanes.

17. The method of claim 14, wherein said soft lithography is selected from a group consisting of microcontact printing, replica molding, micro-transfer molding, micro-molding in capillaries, and solvent-assisted micro-molding.

18. The method of claim 14, wherein said area selective deposition is performed using a thin film deposition process selected from a group consisting of atomic layer deposition, and chemical vapor deposition, wherein a patterned said polymer or monolayer directs said deposition spatially.

19. The method of claim 14, wherein said patterned long-chain polymer or monolayer is removed by thermal treatment, oxygen plasma, UV ozone, or wet chemical etch.

20. The method of claim 14, wherein said area selective deposition using a resist process is repeated to selectively deposit a current collecting layer.

21. The method of claim 14, wherein a current collecting layer is above or below said catalyst layer.

22. The method of claim 1, wherein said fuel cell comprises at least:
   a. a thin and dense electrolyte layer;
   b. an electrode layer, wherein said electrolyte layer is a thin and dense layer or a thin and porous layer;
   c. a layer-structured catalyst, wherein said layer-structured catalyst comprises a porous and patterned layer-structured catalyst; and
   d. a current collector layer, wherein said current collector layer is disposed on said porous and patterned layer-structured catalyst, wherein said porous and patterned layer-structured catalyst is disposed on said electrode layer, wherein said electrode layer is disposed on said electrolyte layer.

23. The method of claim 1, wherein said fuel cell is selected from a group consisting of a hydrogen-fueled solid oxide fuel cell, a solid oxide fuel cell with hydrocarbons, a solid sensor, solid acid fuel cells, polymer electrolyte fuel cells and direct methanol fuel cells.

24. The method of claim 1, wherein said microstructure stabilizing layer and said catalyst layer are a combined layer, wherein said combined layer is deposited in a single deposition step.

* * * * *